: US009614989B2

(12) United States Patent
Lin et al.

(10) Patent No.: US 9,614,989 B2
(45) Date of Patent: Apr. 4, 2017

(54) SCANNER WITH DETACHABLE MECHANISM TO RELEASE JAMMED PAPER

(71) Applicants: Sintai Optical (Shenzhen) Co., Ltd., Taichung (TW); Asia Optical International Ltd., Taichung (TW)

(72) Inventors: Hsien-Chi Lin, HsinChu (TW); Shao-Kang Liu, HsinChu (TW)

(73) Assignee: SINTAI OPTICAL (SHENZHEN) CO., LTD. & ASIA OPTICAL INTERNATIONAL LTD., Taichung (TW)

( * ) Notice: Subject to any disclaimer, the term of this patent is extended or adjusted under 35 U.S.C. 154(b) by 0 days.

(21) Appl. No.: 14/999,151

(22) Filed: Apr. 4, 2016

(65) Prior Publication Data

US 2016/0323465 A1     Nov. 3, 2016

(30) Foreign Application Priority Data

Apr. 29, 2015   (CN) .......................... 2015 1 0212514

(51) Int. Cl.
  *H04N 1/024*   (2006.01)
  *H04N 1/00*    (2006.01)
(52) U.S. Cl.
  CPC ..... *H04N 1/00602* (2013.01); *H04N 1/00588* (2013.01); *H04N 1/00615* (2013.01); *H04N 2201/0081* (2013.01); *H04N 2201/0096* (2013.01)
(58) Field of Classification Search
  CPC ........... H04N 1/00602; H04N 1/00588; H04N 1/00615; H04N 2201/0081

USPC .......................... 358/498, 496, 473; 382/313
See application file for complete search history.

(56) References Cited

U.S. PATENT DOCUMENTS

| | | | | |
|---|---|---|---|---|
| 5,477,238 A * | 12/1995 | Aharanson | .............. | G06F 3/021 345/168 |
| 5,623,285 A * | 4/1997 | Aharonson | ............. | G06F 3/021 345/168 |
| 6,104,508 A * | 8/2000 | Miyazaki | ........... | H04N 1/00352 358/404 |
| 6,801,344 B2 * | 10/2004 | Morinaga | .......... | H04N 1/00525 358/473 |
| 2001/0015829 A1 * | 8/2001 | Veigl | .................. | H04N 1/00538 358/474 |

* cited by examiner

*Primary Examiner* — Cheukfan Lee
(74) *Attorney, Agent, or Firm* — McClure, Qualey & Rodack, LLP (57) ABSTRACT

A scanner with a detachable mechanism to release jammed paper includes a base a, a pickup roller, a pickup mechanism and a scanning module. The base includes an accommodating space and a feeding slot connected to the accommodating space. The pickup roller is rotatably disposed in the base and positioned between the accommodating space and the feeding slot. The pickup mechanism is disposed in the base and adjacent to the pickup roller. The scanning module is detachably disposed in the accommodating space. The scanning module forces the pickup mechanism against the pickup roller when the scanning module is placed in the accommodating space. A pressure exerted on the pickup roller by the pickup mechanism is released when the scanning module is removed out of the accommodating space.

20 Claims, 8 Drawing Sheets

SCANNER WITH DETACHABLE MECHANISM TO RELEASE JAMMED PAPER

BACKGROUND OF THE INVENTION

Field of the Invention

The invention relates to a scanner, and more particularly to a scanner with a detachable mechanism which is utilized to release jammed paper.

Description of the Related Art

Generally, a conventional multi-function office machine includes a mechanism for pushing the feeding rollers or pads to hold and feed paper. In operation, however, paper jam sometimes occurs. If the jammed paper is pulled out forcibly, the paper may tear or wrinkle. Therefore, the recommended way to remove the jammed paper is lifting a cover of the office machine and moving the feeding rollers or the pads away from the jammed paper so that the jammed paper can be easily removed.

BRIEF SUMMARY OF THE INVENTION

Some multi-function office machines are provided with detachable modules (e.g. detachable scanners). Such detachable modules can be utilized to release the jammed paper.

Thus, the invention provides a scanner with a detachable scanning module, wherein the detached scanning module is handheld and the jammed paper can be released by detachment of the scanning module from the scanner.

The scanner in accordance with an exemplary embodiment of the invention includes a base a, a pickup roller, a pickup mechanism, and a scanning module. The base includes an accommodating space and a feeding slot connected to the accommodating space. The pickup roller is rotatably disposed in the base and positioned between the accommodating space and the feeding slot. The pickup mechanism is disposed in the base and adjacent to the pickup roller. The scanning module is detachably disposed in the accommodating space. The scanning module forces the pickup mechanism against the pickup roller when the scanning module is placed in the accommodating space. A pressure exerted on the pickup roller by the pickup mechanism is released when the scanning module is removed out of the accommodating space.

In another exemplary embodiment, the pickup mechanism is a pivoted to the base.

In yet another exemplary embodiment, the pickup mechanism includes a frame pivoted to the base.

In another exemplary embodiment, the frame includes a shaft through which the frame is pivoted to the base, a main body in which the shaft is disposed, and an extending portion extending from the main body into the accommodating space.

In yet another exemplary embodiment, the frame further includes an elastic member disposed in the main body and a pad joined to the elastic member and facing the pickup roller, and the scanning module pushes the extending portion to rotate the main body toward the pickup roller so that the elastic member is deformed and the pad is pressed against the pickup roller when the scanning module is placed into the accommodating space.

In another exemplary embodiment, the elastic member includes an elastic block disposed in the main body.

In yet another exemplary embodiment, the frame further includes a securing member securing the pad and the elastic member to the main body.

In another exemplary embodiment, the frame further includes a guiding member disposed between the pad and the elastic member and having two guiding sheets parallel to the pad.

In yet another exemplary embodiment, the scanner further includes a tray disposed in the base and adjacent to the feeding slot.

In another exemplary embodiment, the scanner further includes at least one feeding roller disposed in the accommodating space.

In yet another exemplary embodiment, the pad is made of frictional material.

In another exemplary embodiment, the scanning module is a handheld scanner.

In yet another exemplary embodiment, the pickup mechanism includes a frame, the frame includes a shaft, and the frame is pivoted to the base through the shaft.

In another exemplary embodiment, the frame includes, a main body in which the shaft is disposed, and an extending portion extending from the main body into the accommodating space.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
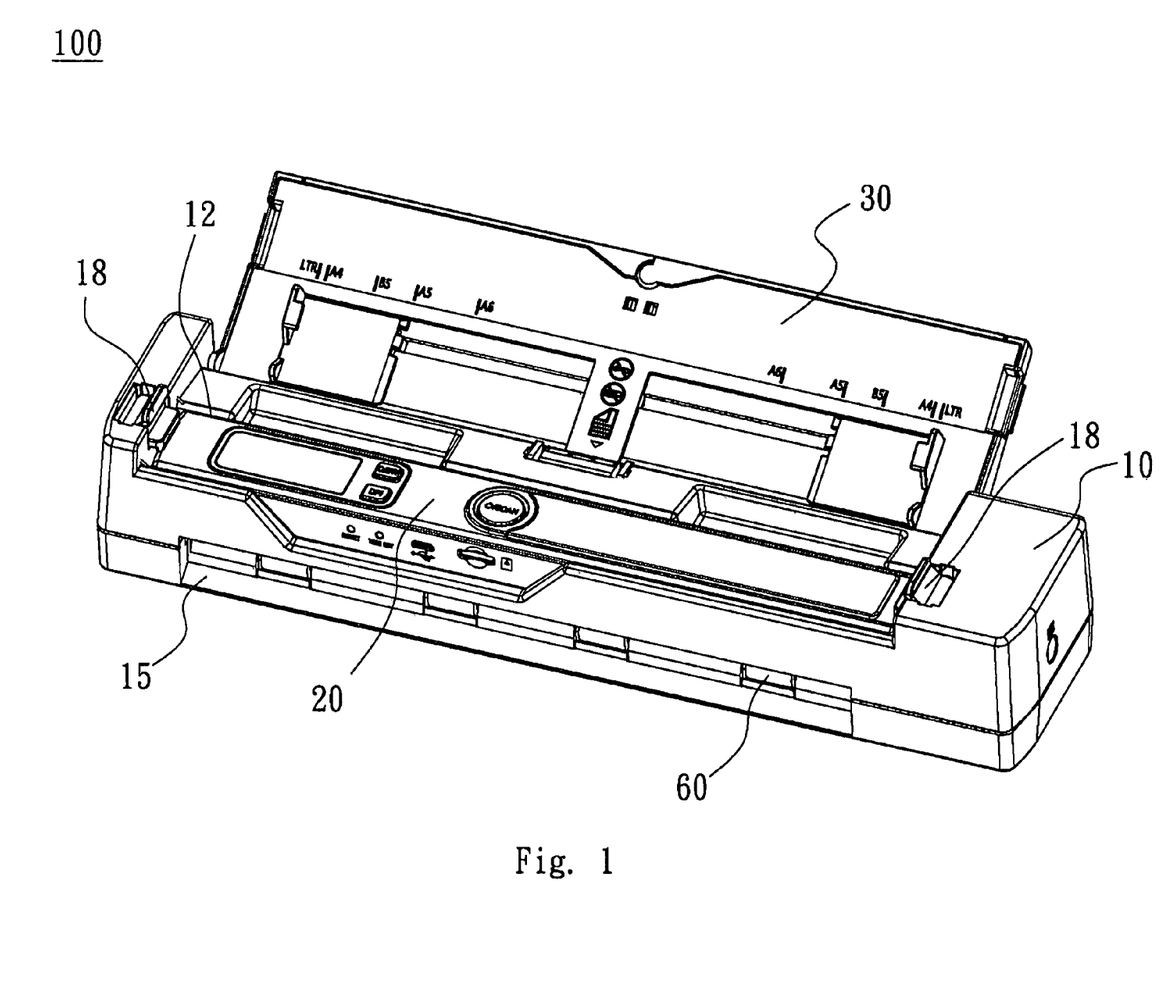
FIG. 1 is a perspective view of an embodiment of a scanner of the invention, wherein a scanning module is attached.
Figure 2:
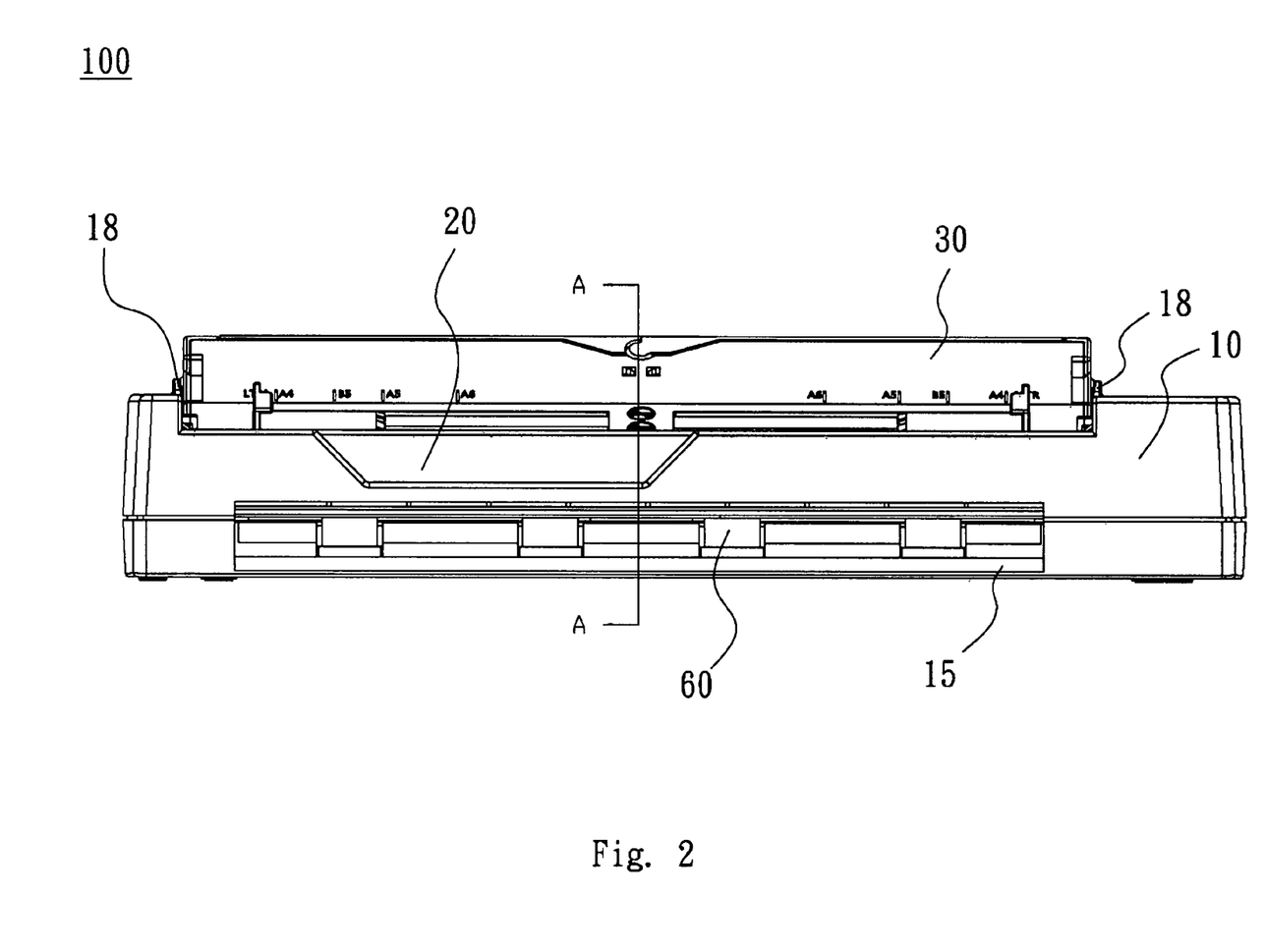
FIG. 2 is a front view of FIG. 1.
Figure 3:
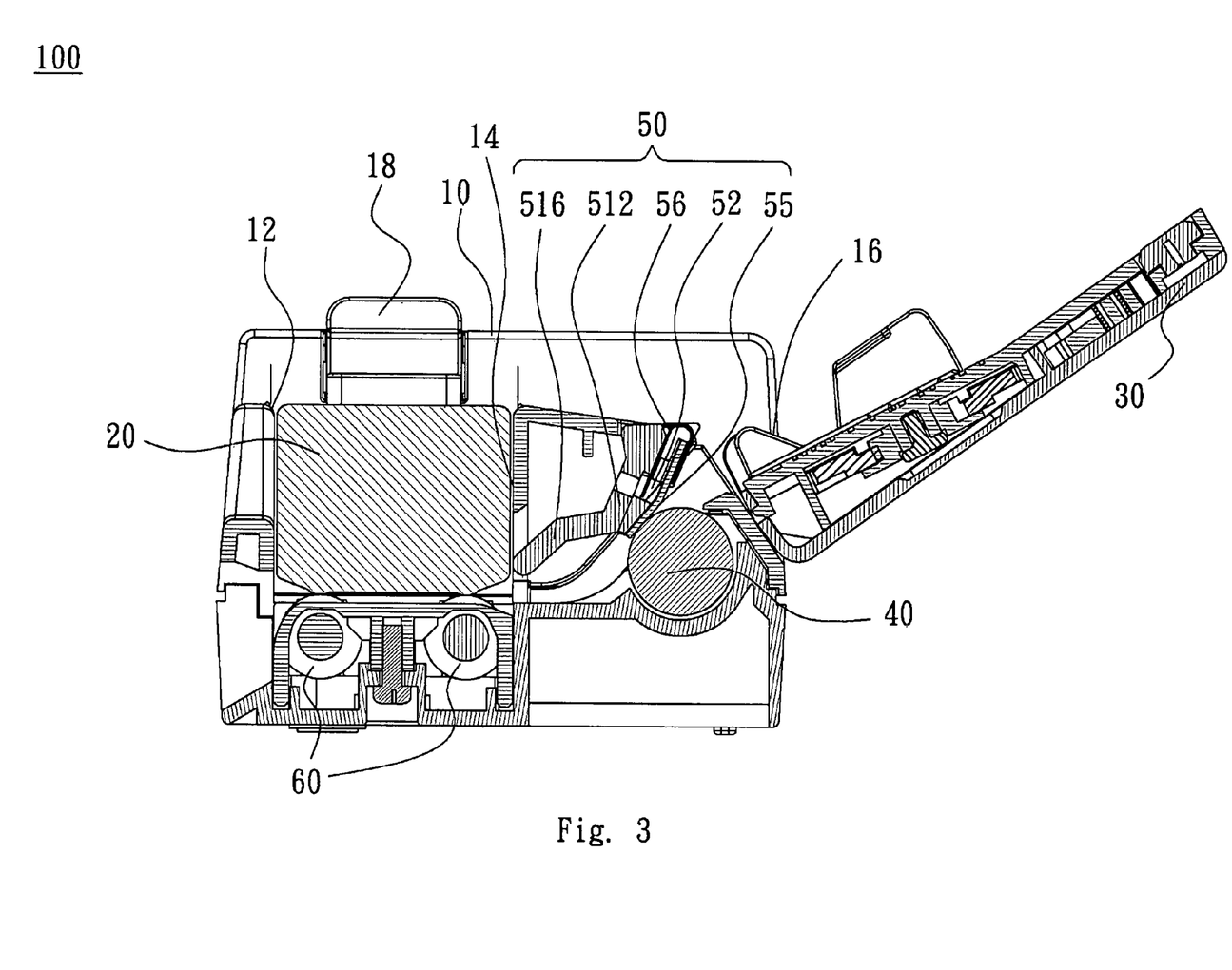
FIG. 3 is a cross section along a line A-A of FIG. 2.

Referring to FIG. 1-3, a scanner 100 of the invention includes a base 10, a scanning module 20, a tray 30, a pickup roller 40, a pickup mechanism 50 and two feeding rollers 60.

Referring to FIG. 3, the base 10 has an opening 12 formed on a top of the base 10. The base 10 further has an accommodating space 14 formed under the opening 12 and a feeding slot 16 formed on a rear wall of the base 10 and connected to the accommodating space 14. The scanning module 20 is placed into the accommodating space 14 through the opening 12 and positioned in the accommodating space 14 through a pair of positioning members 18 disposed on an edge of the opening 12. When the positioning members 18 are pushed outwards from the opening 12, the scanning module 20 can be removed from the accommodating space 14. In this embodiment, the scanning module 20 is a handheld scanner and can be operated to scan documents individually even when removed from the base 10. The tray 30 is disposed on the rear wall of the base 10 and adjacent to the feeding slot 16. The pickup roller 40 is disposed in the base 10 and between the feeding slot 16 and the accommodating space 14. The pickup roller 40 is also adjacent to the tray 30. The pickup mechanism 50 is disposed in the base 10 and between the feeding slot 16 and the accommodating space 14. The pickup mechanism 50 is adjacent to the pickup rollers 40. The feeding rollers 60 are disposed in the accommodating space 14.

The tray 30 is configured to carry documents to be scanned. The pickup roller 40 and the pickup mechanism 50 are capable of picking up and conveying the documents one by one for scanning. When the documents are being scanned, each document is moved by the pickup roller 40 through the feeding slot 16 and conveyed between the pickup roller 40 and the pickup mechanism 50 to enter the accommodating space 14 and pass under the scanning module 20 for scanning. The scanned documents are conveyed by the feeding rollers 60 and leave the scanner 10 through an output slot 15.

Since the documents are held and conveyed by the pickup roller 40 and the pickup mechanism 50, the jammed document can be removed only when the pickup roller 40 and the pickup mechanism 50 do not hold the document. In this embodiment, the detachable scanning module 20 enables the pickup mechanism 50 to hold or release the document. When the scanning module 20 is placed into the accommodating space 14, the scanning module 20 pushes the pickup mechanism 50 against the pickup roller 40 so that the pickup mechanism 50 and the pickup roller 40 is capable of holding and conveying the documents. When the documents are jammed, it only needs to remove the scanning module 20 out of the accommodating space 14. Thus, the pickup mechanism 50 is released from the scanning module 20 and does not press the pickup roller 40 and the jammed document can be removed. The structure of the pickup mechanism 50 is described in the following.

Figure 4:
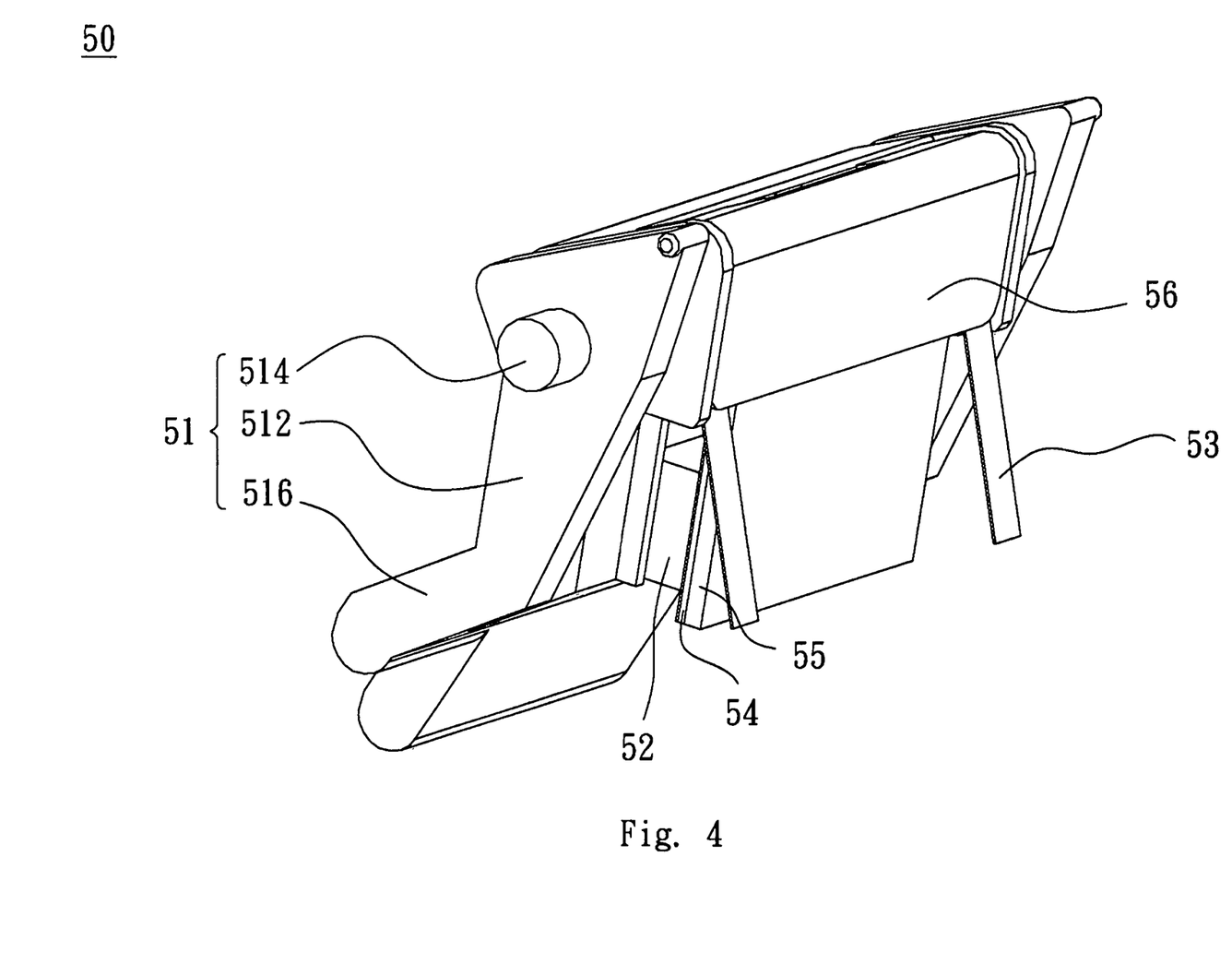
FIG. 4 is a perspective view of an embodiment of a pickup mechanism of a scanner of the invention.
Figure 5:
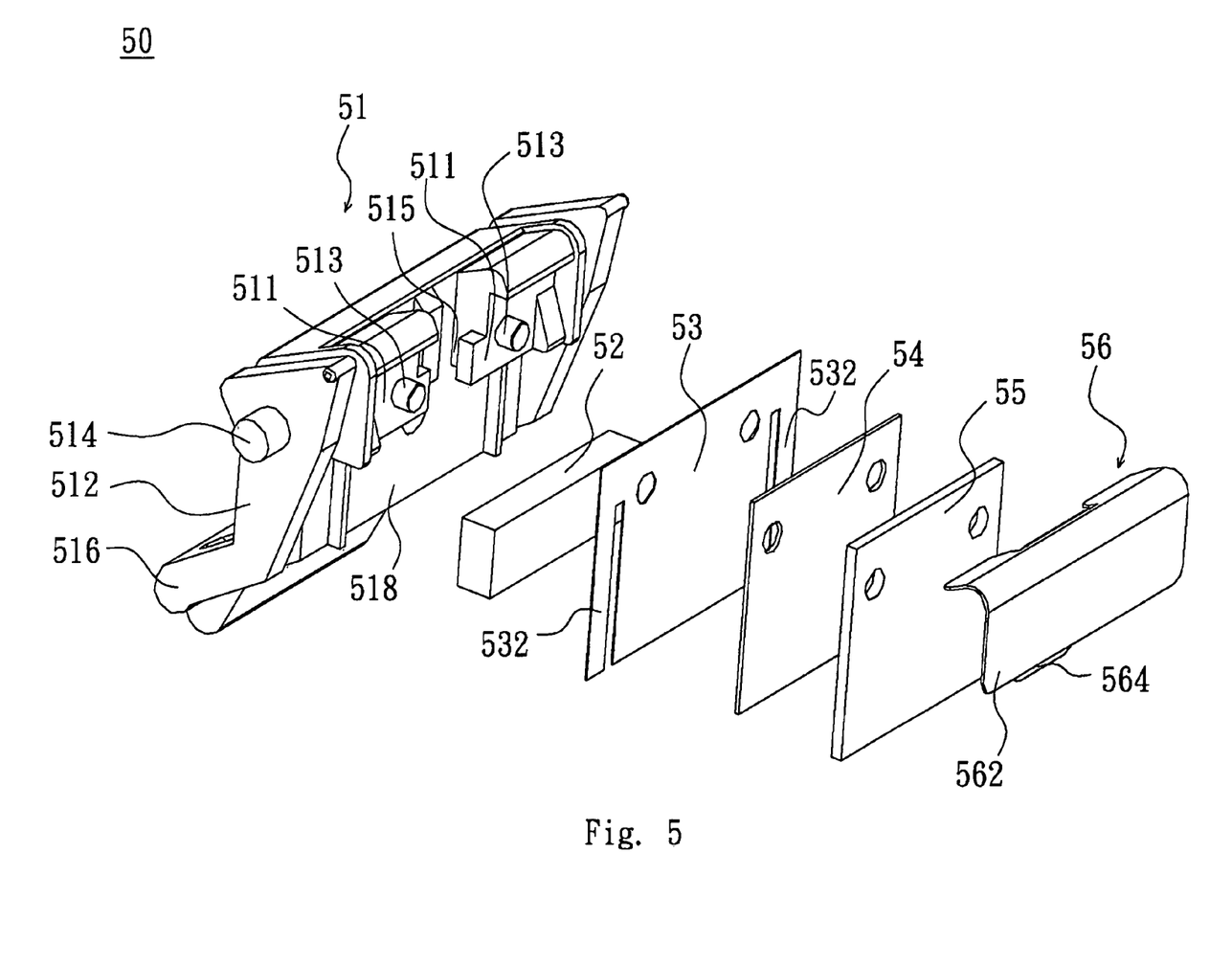
FIG. 5 is an exploded view of the pickup mechanism of FIG. 4.

Referring to FIGS. 4 and 5, the pickup mechanism 50 includes a frame 51, an elastic member 52, a guiding member 53, a spacer 54, a pad 55 and a securing member 56. The frame 51 includes a main body 512, a pair of shafts 514 and an extending portion 516. The shafts 514 are disposed on two sides of the main body 512, and the extending portion 516 extends from the main body 512. The frame 51 is pivoted to the base 10 through the shafts 514. The main body 512 further includes a mounting surface 518 disposed opposite to the extending portion 516. When the frame 51 is mounted to the base 10, the extending portion 516 extends into the accommodating space 14, and the mounting surface 518 faces the pickup roller 40. Two bosses 511 are disposed on the mounting surface 518, and each boss 511 has a positioning pin 513 disposed thereon. The two bosses 511 are spaced a distance apart to form an engaging notch 515 therebetween. The elastic member 52 is disposed on the mounting surface 518, and the guiding ember 53, the spacer 54 and the pad 55 are positioned on the boss 511 by the positioning pin 513. In this embodiment, the elastic member 52 is an elastic block. The securing member 56 includes a holding portion 562 and an engaging plate 564 parallel to the holding portion 562. The securing member 56 is fixed to the frame 51 through the engagement of the engaging plate 564 and the engaging notch 515. The guiding member 63, the spacer 54 and the pad 55 are held on the boss 511 by the holding portion 562. The elastic member 52 is positioned on the mounting surface 518.

Figure 6:
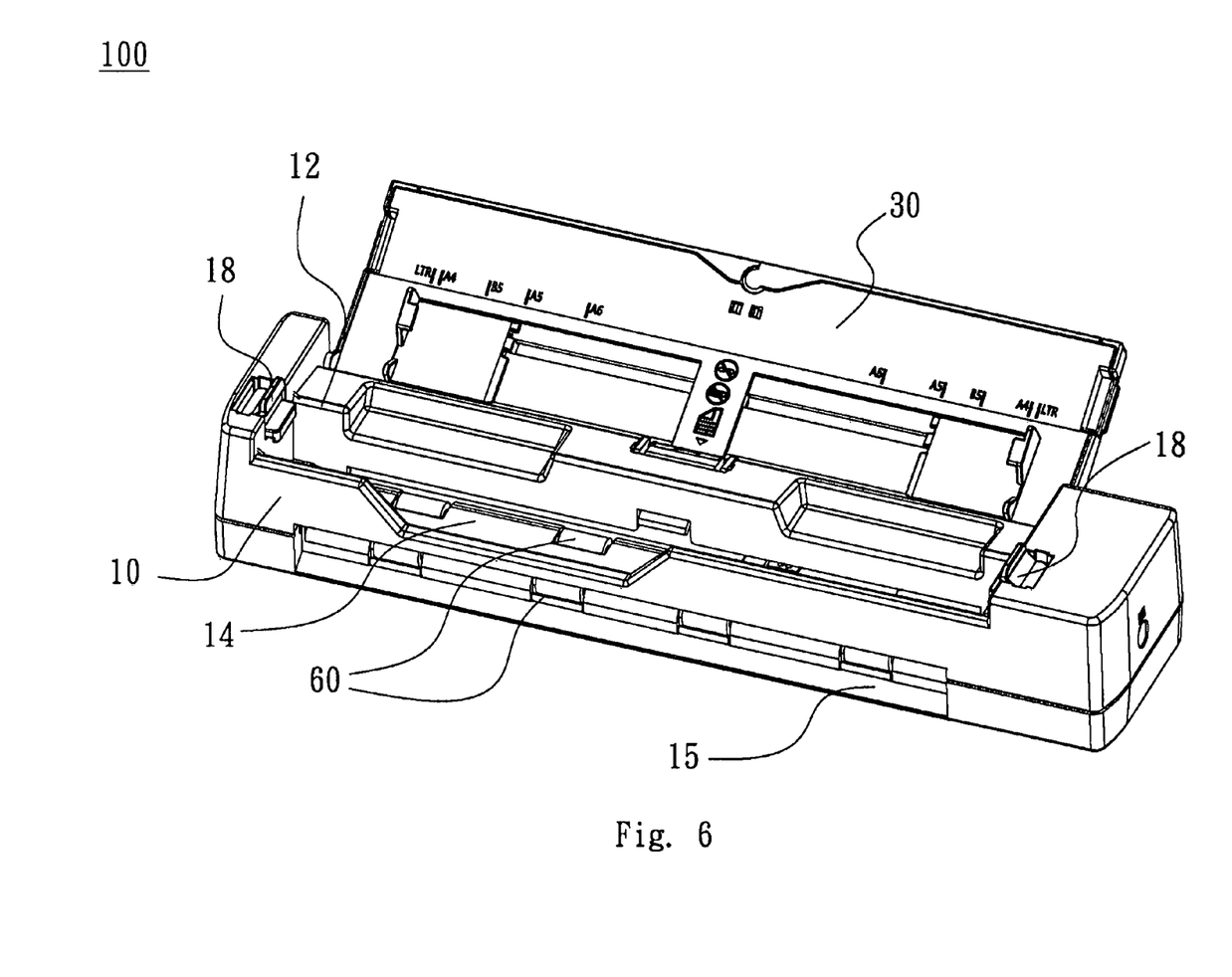
FIG. 6 is a perspective view of an embodiment of a scanner of the invention, wherein a scanning module is detached.
Figure 7:
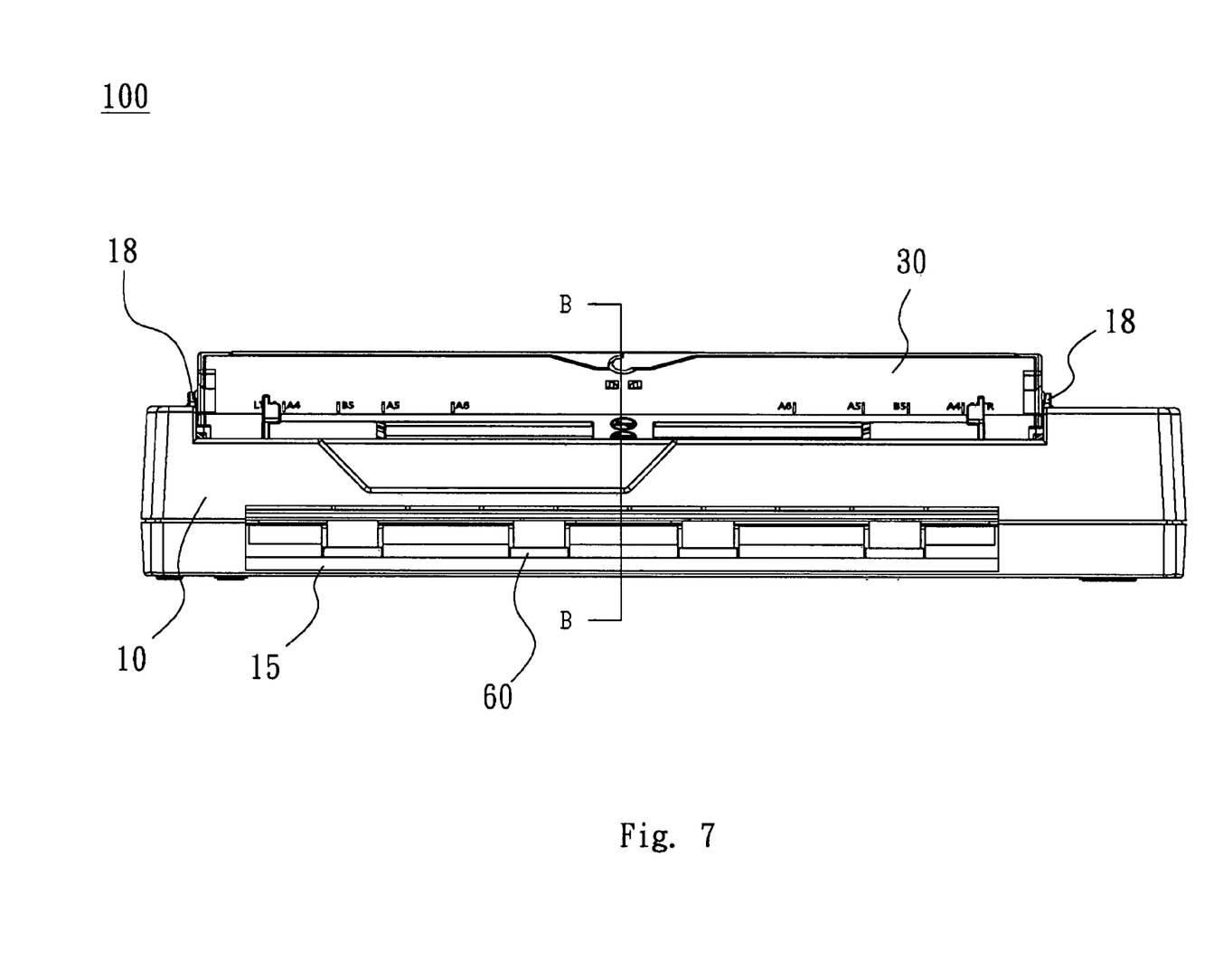
FIG. 7 is a front view of FIG. 6.
Figure 8:
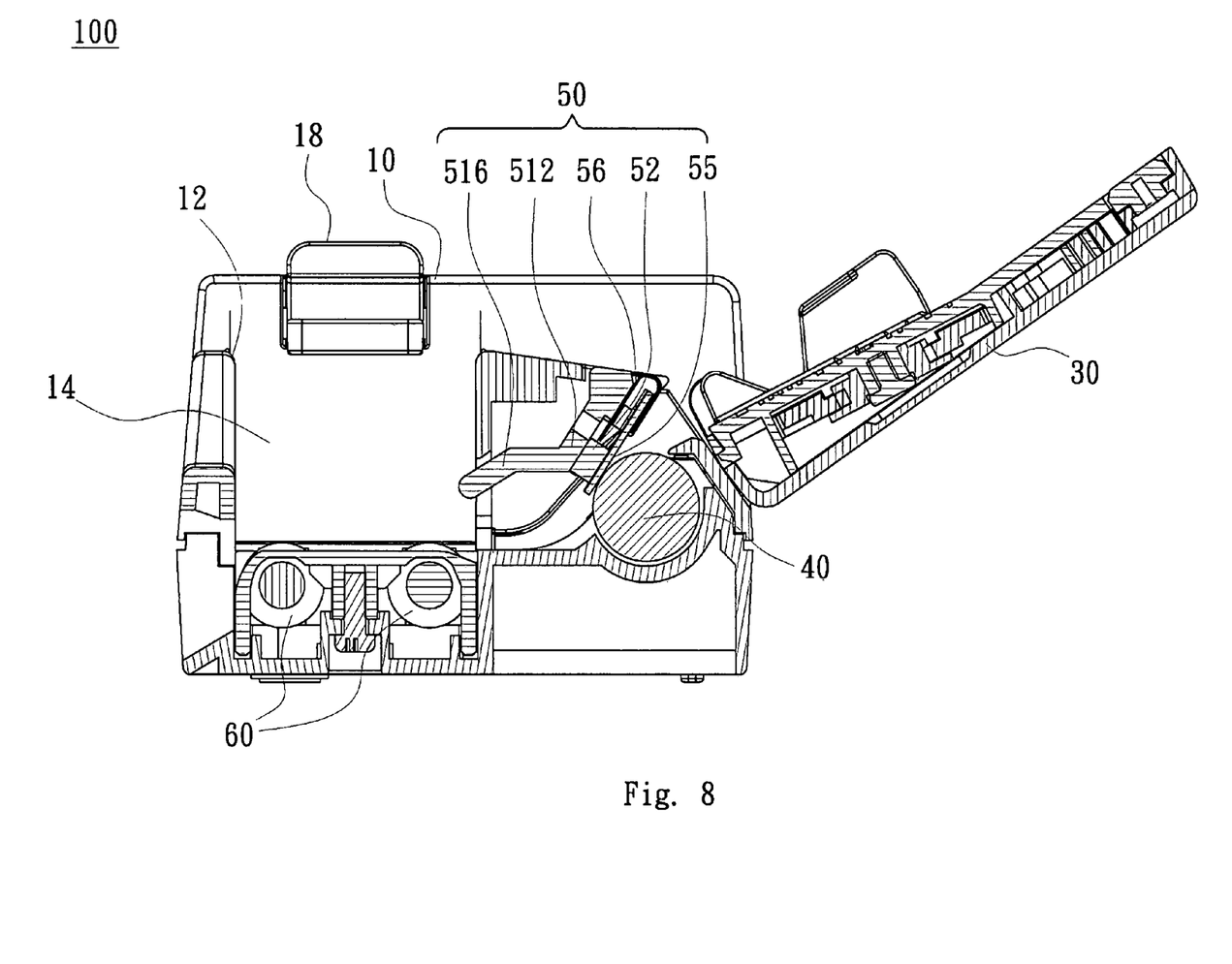
FIG. 8 is a cross section along a line B-B of FIG. 7.

The removal of the jammed document through the detachment of the scanning module 20 is described as follows. Referring to FIG. 3 again, when the scanning module 20 is placed into the accommodating space 14, the scanning module 20 pushes the extending portion 516 to rotate the frame 51 toward the pickup roller 40 so that the pad 55 presses the pickup roller 40 and the elastic member 52 is deformed. The deformation of the elastic member 52 generates a force to push the pad 55 against the pickup roller 40, whereby the documents can be held and conveyed one by one between the pad 55 and the pickup roller 40. The pad 55 is made of frictional material for providing a sufficient friction force to convey documents along with the pickup roller 40. The guiding member 53 includes two guiding sheets 532 disposed on two lateral sides of the guiding member 53. The guiding sheets 532 are configured to guide a single sheet of the document to a position between the pad 55 and the pickup roller 40 when only one sheet of document is to be scanned or the last sheet of document is to be fed into the base 10. Also, multiple sheets of document can be guided by the guiding sheets 532. When the documents are jammed, it needs only to remove the scanning module 20 out of the accommodating space 14 as shown in FIGS. 6, 7 and 8. Since the force exerted on the extending portion 516 is eliminated, the pad 55 does not force the pickup roller 40. The jammed documents can be easily removed.

The jammed documents in the scanner 100 of the invention can be easily removed through the detachment of the detachable scanning module 20. No additional elements are provided in the scanner 100 of the invention to achieve the purpose of removal of jammed documents.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scanner, comprising:
    a base comprising an accommodating space and a feeding slot connected to the accommodating space;
    a pickup roller rotatably disposed in the base and positioned between the accommodating space and the feeding slot;
    a pickup mechanism disposed in the base and adjacent to the pickup roller; and
    a scanning module detachably disposed in the accommodating space, wherein when the scanning module is placed in the accommodating space, the scanning module forces the pickup mechanism against the pickup roller, and when the scanning module is removed out of the accommodating space, a pressure exerted on the pickup roller by the pickup mechanism is released.

2. The scanner as claimed in claim 1, wherein the pickup mechanism is pivoted to the base.

3. The scanner as claimed in claim 2, wherein the pickup mechanism comprises a frame pivoted to the base.

4. The scanner as claimed in claim 3, wherein the frame comprises a shaft through which the frame is pivoted to the base, a main body in which the shaft is disposed, and an extending portion extending from the main body into the accommodating space.

5. The scanner as claimed in claim 4, wherein the frame further comprises an elastic member disposed in the main body and a pad joined to the elastic member and facing the pickup roller, and the scanning module pushes the extending portion to rotate the main body toward the pickup roller so that the elastic member is deformed and the pad is pressed against the pickup roller when the scanning module is placed into the accommodating space.

6. The scanner as claimed in claim 5, wherein the elastic member comprises an elastic block disposed in the main body.

7. The scanner as claimed in claim 5, wherein the frame further comprises a securing member securing the pad and the elastic member to the main body.

8. The scanner as claimed in claim 5, wherein the frame further comprises a guiding member disposed between the pad and the elastic member and having two guiding sheets parallel to the pad.

9. The scanner as claimed in claim 5, wherein the pad is made of frictional material.

10. The scanner as claimed in claim 3, wherein the frame comprises, a main body in which the shaft is disposed, and an extending portion extending from the main body into the accommodating space.

11. The scanner as claimed in claim 2, wherein the pickup mechanism comprises a frame, the frame comprises a shaft, and the frame is pivoted to the base through the shaft.

12. The scanner as claimed in claim 1, further comprising a tray disposed in the base and adjacent to the feeding slot.

13. The scanner as claimed in claim 1, further comprising at least one feeding roller disposed in the accommodating space.

14. The scanner as claimed in claim 1, wherein the scanning module is a handheld scanner.

15. A scanner, comprising:
a base comprising an accommodating space and a feeding slot connected to the accommodating space;
a pickup roller rotatably disposed in the base and positioned between the accommodating space and the feeding slot;
a pickup mechanism disposed in the base and adjacent to the pickup roller; and
a scanning module detachably disposed in the accommodating space, wherein when the scanning module is placed in the accommodating space, the scanning module forces the pickup mechanism against the pickup roller, and when the scanning module is removed out of the accommodating space, a pressure exerted on the pickup roller by the pickup mechanism is released;
wherein the pickup mechanism comprises a frame pivoted to the base.

16. The scanner as claimed in claim 15, wherein the frame comprises a shaft through which the frame is pivoted to the base, a main body in which the shaft is disposed, and an extending portion extending from the main body into the accommodating space.

17. The scanner as claimed in claim 16, wherein the frame further comprises an elastic member disposed in the main body and a pad joined to the elastic member and facing the pickup roller, and the scanning module pushes the extending portion to rotate the main body toward the pickup roller so that the elastic member is deformed and the pad is pressed against the pickup roller when the scanning module is placed into the accommodating space.

18. The scanner as claimed in claim 17, wherein the elastic member comprises an elastic block disposed in the main body.

19. The scanner as claimed in claim 17, wherein the frame further comprises a securing member securing the pad and the elastic member to the main body.

20. The scanner as claimed in claim 17, wherein the frame further comprises a guiding member disposed between the pad and the elastic member and having two guiding sheets parallel to the pad.

* * * * *